Wallace A. McMillan
INVENTOR
BY R. J. Dearborn
HIS ATTORNEY

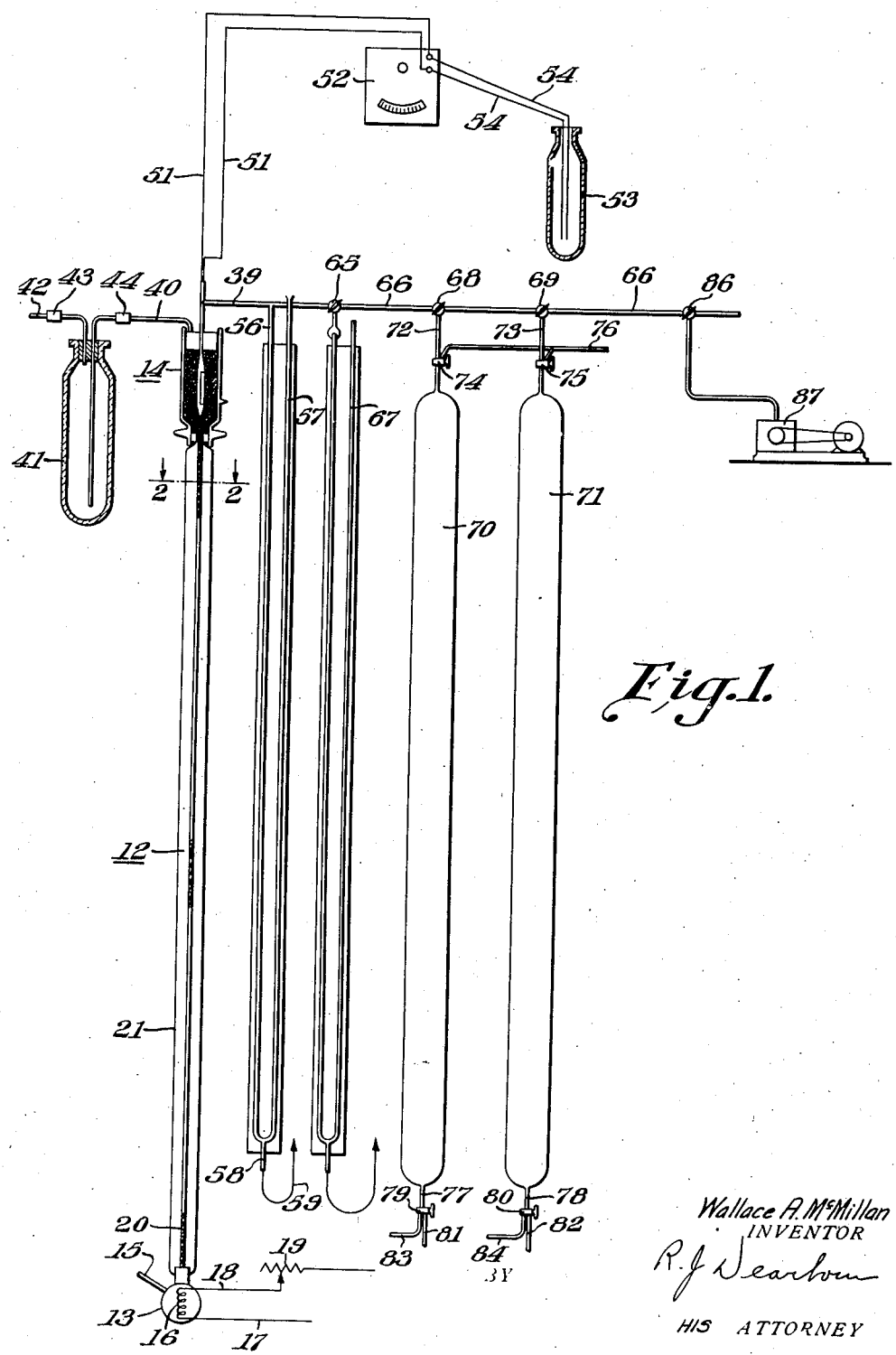

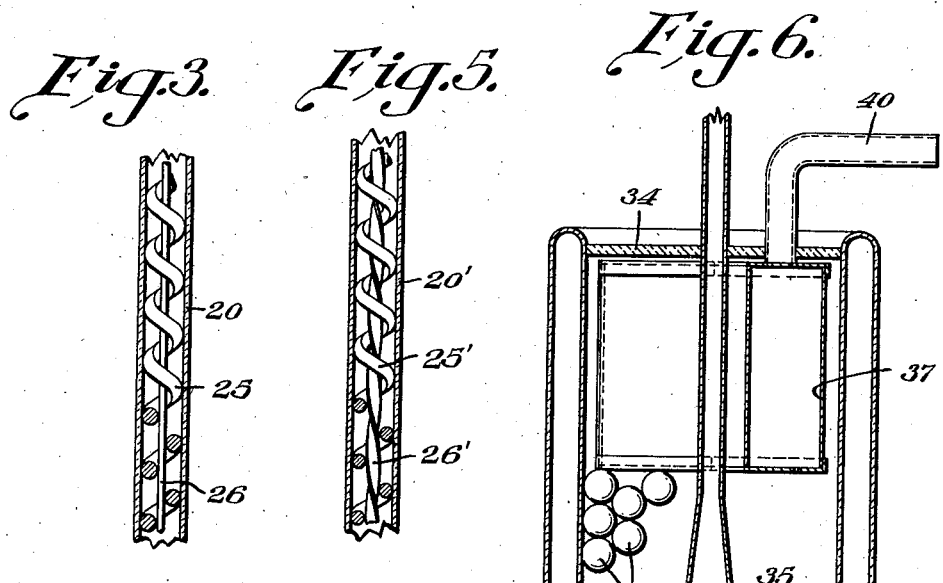
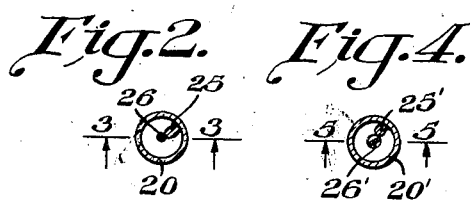
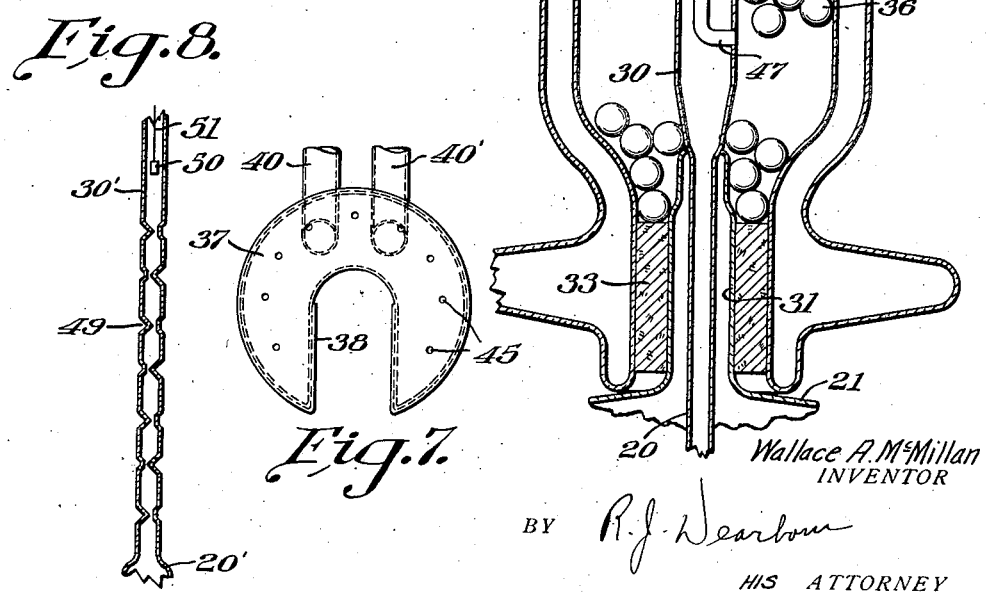

Patented June 18, 1935

2,005,323

UNITED STATES PATENT OFFICE 2,005,323

DISTILLING AND FRACTIONATING APPARATUS

Wallace A. McMillan, Beacon, N. Y., assignor to The Texas Company, New York, N. Y., a corporation of Delaware Application January 13, 1934, Serial No. 706,479

18 Claims. (Cl. 202—160)

This invention relates to distilling and fractionating apparatus, and more particularly to apparatus of this character adapted for the analysis of mixtures of volatile liquids, gases or vapors containing condensible liquid fractions.

An apparatus for analytical distillation and fractionation, comprising essentially a distilling bulb, an elongated fractionating tube surmounting the distilling bulb, and a condenser section at the upper end of the fractionating tube, with accessories for collecting and measuring the vapor distilled, is known; for example, see Podbielniak Patent No. 1,917,272, dated July 11, 1933. Such apparatus operates on the principle of sharp fractionation in order to separate constituents of the mixture being analyzed in the order of their boiling points. While apparatus of this character is available on the market, it has so far sufficed to give only a rough analysis of the gaseous or liquid mixtures, and has proved incapable of giving accurate quantitative results, or even reproduceable results with different operators.

I have discovered that one of the difficulties of existing equipment results from inadequate and incomplete contact of vapors with reflux liquid in the fractionating column. It has been heretofore proposed to employ a packing in the fractionating column for the purpose of improving the vapor-reflux contact, this packing comprising a hollow wire spiral. While contributing to the improvement of the column, results are still far short of quantitative accuracy. I have discovered that vapors short circuit through such a column by linear flow through the core of the spiral without adequate contact with reflux liquid descending along the spiral. One of the objects of the present invention is to provide an improved packing for an analytical fractionating column of this type which will insure efficient contact of vapors with reflux liquid.

I have discovered that another defect in columns of this type resides in the condenser section, due to incomplete or insufficiently controlled heat interchange of the vapors with the cooling medium, and also due to the fact that the condenser tube has a comparatively large vapor volume serving to hold back substantial amounts of vapor and to produce objectionable fluctuation in the distillation curve. Another object of this invention is to provide an improved construction of condenser section, including a novel cooling arrangement, as well as a novel form of condenser tube having large surface to volume ratio, to overcome the objections above enumerated.

In analytical distilling and fractionating columns of this type heretofore proposed, the rate of distillation (which means the rate of passage of vapors from the condenser to the receiver) has been controlled by a manually adjustable rate cock in the vapor offtake line. For given conditions of heat input to the distilling bulb and heat extraction from the condenser section, partial closing of this valve causes pressure to build up within the column; and movement of the valve toward open position causes vapors to be discharged more rapidly to the receiver with a reduction in pressure within the column. It is desirable to control the pressure within the column, so that the distillation may be carried out at a certain definite pressure. For example, the distillation may be effected at atmospheric pressure, or at a certain sub-atmospheric or superatmospheric pressure, depending upon the constituents being analyzed. In order to hold a definite pressure within the column, constant attention to the distillation pressure and frequent manipulation of the rate cock are required. Another object of the present invention is to provide a device for automatically controlling the rate of distillation and for maintaining a regulable but definite and predetermined pressure upon the column.

Other objects and advantages of the present invention will be apparent from the following description, when taken in conjunction with the accompanying drawings and appended claims.

In the drawings in which like characters of reference designate like parts throughout the several views thereof Fig. 1 is an elevational view, generally diagrammatic, of an analytical distilling and fractionating column and accessories, and embodying the improvements of the present invention;

Fig. 2 is a horizontal sectional view on an enlarged scale of the fractionating tube and packing, taken on the plane of the line 2—2 of Fig. 1;

Fig. 3 is a partial vertical sectional view taken on the plane of the line 3—3 of Fig. 2;

Fig. 4 is a horizontal sectional view similar to Fig. 2, illustrating a fractionating tube with a modified form of packing;

Fig. 5 is a vertical sectional view taken on the plane of the line 5—5 of Fig. 4;

Fig. 6 is an enlarged vertical sectional view through the condenser cooling section;

Fig. 7 is a bottom view of the evaporator removed from the condenser cooling section;

Fig. 8 is an enlarged partial elevational view of a modified form of condenser tube;

Figure 9:
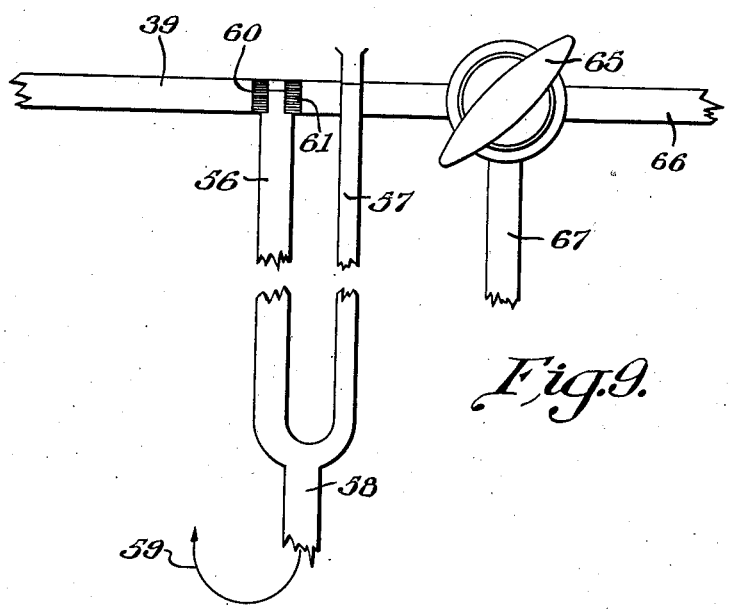
Fig. 9 is an enlarged vertical sectional view of the automatic pressure control.

Referring to the drawings, in which are illustrated preferred embodiments of the invention, a fractionating column is indicated at 12, having a distilling bulb 13 at the lower end thereof, and a condenser section 14 at the upper end thereof. The distilling bulb 13 is provided with an intake 15 through which the sample to be analyzed is admitted to the bulb and column. Mechanism for admitting the sample to the column may be of conventional construction, and as it forms no part of the present invention, is not illustrated herein. A suitable heating means is provided for the distilling bulb, illustrated as a submerged electrical coil 16 having leads 17 and 18, and including an adjustable resistance 19 in the electrical circuit for suitable control of the heat input to the liquid within the distilling bulb. While a submerged coil is illustrated, it is to be understood that any other suitable form of heating means may be provided, such as an external heating coil. It is also to be understood that the distilling bulb is adapted to be confined within a thermos bottle (not shown), if desired, such as for precooling the sample to be distilled, or for providing thermal insulation for the distilling bulb during the distillation.

The neck of the distilling bulb communicates with the fractionating tube 20 of the column. A jacket 21, which may be formed integrally or separately from the fractionating tube, surrounds the fractionating tube throughout its entire extent, providing a chamber which is highly evacuated to afford effective thermal insulation. The fractionating tube 20 is preferably about 2 to 6 feet in length and has an internal diameter not exceeding about 10 mm. Generally, the tube will have an internal diameter of about 3 to 6 mm., so as to afford a small vapor volume therein. Vapors formed in the distilling bulb 13 pass upwardly through the tube 20 to the condenser 14, where they are cooled to condense a portion of the vapors, the liquid being returned as reflux to the fractionating tube 20 and passing downwardly therein counter-current to the upflowing vapors.

Referring more particularly to Figs. 2 and 3, a preferred form of packing for the fractionating tube is therein illustrated, the purpose being to increase the length of the path of flow and the intimacy of contact of the vapors and reflux liquid. This packing comprises a spiral wire 25 which fits snugly against the interior wall of the tube 20, and extends throughout the length of the fractionating tube. Positioned within the spiral is a straight wire insert 26, which substantially fills the central core of the spiral. This construction compels the upflowing vapors, as well as the downflowing reflux, to travel in a spiral path throughout the fractionating tube, and obviates short circuiting of the vapors in a linear flow through the central core of the spiral, as well as preventing the travel of reflux by capillary flow straight down the interior wall of the tube 20 on the outer side of the spiral 25. The whirling movement imparted to the vapor forces them outwardly by centrifugal force into contact with the reflux liquid flowing along the side wall of the tube 20 and along the surface of the turns of the spiral 25.

It is to be noted that the cross sectional area of the spiral 25 is greater than the cross sectional area of the insert 26. In a fractionating tube of extremely small internal diameter, such as one of less than 10 mm., the space afforded between the inner wall of the fractionating tube and the insert is quite small. For the efficient functioning of the fractionating column, the reflux return from the partial condenser 14 to the tube 20 should be at a substantial rate, such as in excess of 10 drops per minute, and often runs as high as 100 drops or more per minute. If insufficient space is left between the inner wall of the tube and the insert, the liquid will be held by capillary attraction so as to substantially fill the intervening space, thereby flooding the column and thus interfering with proper fractionation. I have found that satisfactory results may be obtained with a column of the length and diameter stated, when a spiral is employed which has from about 4 to 8 turns per inch, and whose cross sectional area exceeds that of the insert. The exact sizes of the spiral and insert will vary for different diameter reflux tubes, and for different distilling and refluxing rates, as will be well understood. It may be pointed out, however, that the proper proportioning of the parts is of vital importance in securing accurate analysis. The principle of operation, and the manner of selecting the type of spiral and insert, are set forth above; and by following this teaching, the correct sizes and proportions of the parts for any particular set of conditions can be readily determined by simple trial. By way of example, and without intending any limitation in scope, it may be stated that very satisfactory results have been secured with a fractionating column having a length of approximately 90 cm. and an internal diameter of approximately 3.8 mm., when a 6 turn per inch #15 gauge wire spiral is employed together with a #23 gauge straight wire insert. Elements of similar proportion in relation to the internal diameter of the column, will give satisfactory results for fractionating tubes of different internal diameters.

While the spiral and insert of Figs. 2 and 3 are of circular cross section, satisfactory results may be obtained with elements of different cross section, as long as the spiral fits snugly against the inner wall of the fractionating tube, and the insert substantially fills the central core of the spiral so as to compel the vapors to travel in a spiral path. Figs. 4 and 5 illustrate a modified form of packing which has also given satisfactory results, although not quite as good as in the preferred form of Figs. 2 and 3. As shown in Figs. 4 and 5, an outer spiral 25' snugly fitting against the interior wall of fractionating tube 20' has positioned therein a flat spiral insert 26', which has a ribbon width substantially filling the central core of the outer spiral. In this connection, a distinction is made between an ordinary spiral, and a flat spiral, when employed for the insert; the former can only partially fill the central core of the outer spiral and thus affords a substantial space for linear flow of vapors up through the central core immediately about the inner spiral without being forced outwardly toward the wall of the tube between the turns of the outer spiral. A flat spiral, on the other hand, functions similarly to a straight wire insert, in that it substantially fills the central core of the outer spiral. That is, the width of the flat spiral is such that it substantially contacts with the inner surface of the outer spiral throughout the length thereof, so that substantially all of the vapors are forced to travel in a spiral path up the column between the turns of the outer spiral. By way of example, very satisfactory results have been secured with a fractionating tube having a length of approximately 90 cm. and an internal diameter of approximately 3.8 mm., when a 6 turn per inch #16 gauge outer spiral is employed with a 6 turn per inch flat spiral insert which substantially fills the central core of the outer spiral.

It is to be noted that in a column of this type, the action taking place in the tube 20 is that of fractionation, or intimate contact of vapors with reflux liquid, where any heat interchange is between the vapors and the liquid, and substantially no heat is lost to or from the atmosphere. The actual condensation takes place in the condenser 14, where a cooling fluid is applied. Due to the efficient thermal insulation of the vacuum jacket 21 about the fractionating tube 20, such fractionation is substantially adiabatic. Consequently, the amount of reflux liquid traveling down the tube 20 remains more or less constant throughout the length of the tube for any given reflux rate. The spiral and insert are, therefore, constructed of a uniform size and relationship throughout the length of the column, to give the satisfactory intimate contact of reflux and vapor throughout that length.

Referring more particularly to Fig. 6, it is seen that the fractionating tube 20 is somewhat enlarged at its upper end into a condenser tube 30. The vacuum jacket 21 is contracted at 31 and joins the condenser tube 30 adjacent the base thereof. An additional and separate hollow vacuum jacket 32 surounds the condenser tube and is spaced therefrom, being mounted on a cork gasket 33 fitting the contracted portion 31. At the upper portion of the jacket 32 is positioned a loose-fitting asbestos packing or gasket 34. A cooling chamber or space 35 is thereby formed between the jacket 32 and the condenser tube 30, which space is in direct thermal contact with the outer wall of the condenser tube. Positioned within space 35 are a plurality of metallic bodies 36, shown in the form of balls, and which are constructed of a metal of high heat conductivity, such as aluminum, copper and the like. The balls 36 only partially fill the cooling chamber 35; and positioned in the upper portion of the chamber and resting on the balls is an evaporator 37. Its cross section may be as shown in Fig. 7, being generally circular in shape except for a cutaway slot 38 which enables it to be positioned about the upstanding portion of condenser tube 30 which extends up through the packing 34 and communicates with a vapor offtake 39.

Evaporator 37 is supplied with refrigerant, such as liquid air or $CO_2$, by pipe 40 extending from thermos bottle or reservoir 41. Fluid pressure is admitted to the upper part of reservoir 41 by pipe 42 to thereby force the refrigerant to the evaporator 37, its rate of supply being controlled by valves 43 and 44 in pipes 42 and 40 respectively. As the refrigerant is introduced into the evaporator 37, it expands therein, and the expanded refrigerant is then jetted downwardly into cooling chamber 35 through a plurality of very fine downwardly directed distributing ports 45 drilled in the bottom wall of the evaporator, as shown in Fig. 7. The expanded refrigerant thus comes in direct contact with the exterior wall of condenser tube 30 and with the metallic beads 36. The latter aid the conduction of heat from the wall of the condenser tube 30, with which some of them directly contact, to circulating vapors of refrigerant, to thereby give a rapid and efficient cooling action. An offtake 40' permits discharge of some of the expanded refrigerant from evaporator 37 to avoid the building up of excessive pressures therein.

In order to increase the effective condensing surface, while at the same time decreasing the vapor volume of the condenser, a hollow internal tube 46 is positioned within the central portion of tube 30. Opposite ends of tube 46, as indicated at 47, extend through the wall of the outer tube 30 and open into the cooling chamber 35, so that the inner tube 46 directly communicates with the cooling chamber, and the surfaces of both tubes 30 and 46 function as condensing surfaces. By way of example, the condenser tube 30 may have an internal diameter of substantially 7.5 mm., while the inner tube 46 may have an over-all diameter of substantially 5.0 mm., thereby affording an annular condensing passage 48 of a width of substantially 1.25 mm. The heat conducting bodies or balls 36 are preferably made of sufficient size or diameter, such for example as a diameter of 0.25 inch, to afford a void of substantial volume within cooling chamber 35 to allow for circulation of refrigerant. Expanded vapors within chamber 35 can escape past the packing 34 which fits loosely about the extension of tube 30 and pipe 40.

The present construction of condenser section affords substantial advantages over the conventional arrangements heretofore proposed for analytical columns of this character. Thus, the condenser tube affords a very high effective surface to volume ratio. By the provision of an increased cooling surface for a decreased vapor volume, the vapors are brought into better contact with the condenser surface so that a more uniform vapor offtake temperature may be obtained. At the same time, the dead space volume of the apparatus, that is, the volume which will remain filled with vapor at the termination of an analysis and thus reduce the accuracy of such analysis, is materially reduced. It is found that the dry cooling by means of a cooling chamber which directly contacts with the exterior wall of the condenser tube obviates the erratic results obtainable with a liquid cooling bath even when a stirrer is employed, and obviates the time lag inherent in a construction in which dry cooling is used but in which the refrigerant is maintained solely within the evaporator and the evaporator in turn is spaced from the condenser tube. By positioning the evaporator at the upper end of the cooling chamber, and discharging the expanded refrigerant through a number of distributing ports, a more accurate control of temperature conditions is obtained without violent fluctuations. The use of metallic heat conducting bodies beneath the evaporator further contributes to more accurate results. The condenser assembly has the further advantage of providing a temperature gradient along the condenser tube, varying from the coldest temperature adjacent the upper end thereof to the highest temperature adjacent the lower end thereof, as distinguished from the opposite gradient resulting from constructions in which the evaporator extends primarily throughout the length of the condenser tube. In the present construction, condensation takes place primarily below the evaporator 37 and not opposite it.

Referring to Fig. 8, there is illustrated a modified form of condenser tube 30', which embodies the same principles of operation enumerated above. The increased effective surface to volume ratio over that available in the fractionating tube 20' (considering the surface of the tube only as the effective surface) is obtained by forming the condenser tube 30' of decreased internal diameter, and by providing a number of indentations 49 throughout the length of the active condensing section of the tube. For example, with a fractionating tube 20' having an internal diameter of approximately 3.8 mm., very satisfactory results have been secured with a single wall indented condenser tube 30' of an internal diameter of approximately 3.3 mm., having a series of staggered indentations throughout the length thereof as shown, the indented portion being positioned within the cooling chamber 35 opposite the heat conducting balls 36, with the evaporator 37 immediately above this portion, in the manner illustrated in Fig. 6.

The temperature of the vapors escaping by offtake 39 is controlled by the rate of introduction of cooling fluid. This temperature is conveniently recorded by a thermocouple, whose position with relation to the condenser tube has been found to be important for accurate results. As shown in Fig. 8, the thermocouple is preferably positioned a short distance, such for example as 1 inch, above the indented portion 49 of the tube, as indicated at 50. Leads 51 extend from the thermocouple to a conventional milli-volt meter 52, the cold junction of which is maintained constant by being positioned within a thermos bottle 53 containing a suitable refrigerant, such as ice water, and connected to the poles of the volt meter by leads 54.

Opening into a horizontal extending portion of the vapor offtake 39 is one leg 56 of a mercury manometer of the Y-type, having an atmospheric leg 57 and a bottom connection 58 to a flexible tube and bulb 59 which is arranged for adjustment as to height. As shown more particularly in Fig. 9, porous members 60 and 61 are positioned within the offtake 39 at opposite sides of the location where the tube 56 opens into the offtake 39. These porous bodies are so constructed as to be permeable to vapors but impervious to mercury. Satisfactory results are secured where the porous bodies are constructed of sintered glass filter plates, formed in the shape of disks which are sealed in the offtake, the two disks being spaced a small distance from each other. The adjusting tube and bulb 59 are regulated to bring the mercury level in the leg 56 to a point just below the tops of disks 60 and 61, when the desired distillation pressure exists in the offtake 39. When this adjustment is effected, the device then serves to automatically maintain this distillation pressure upon the column. That is, it allows vapors to pass from the condenser past the disks 60 and 61 only when the pressure within the offtake 39 is above a predetermined normal. Reduction in pressure in the offtake below this predetermined normal causes a rise of the mercury column along adjacent edges of disks 60 and 61 to partially close or reduce the effective area of the vapor passage and thereby retard the rate of distillation. Further reduction in pressure will cause the mercury column to rise to the top of the disks and completely close the vapor offtake, so that no vapors can pass from the column to the receivers until the predetermined distillation pressure is again attained within the column.

This construction is of distinct advantage in analytical apparatus of this character, as it entirely eliminates the use of a manual rate cock which must be frequently adjusted by hand as the character of distillation changes, and which is apt to be one cause of inaccuracy of results due to inattention on the part of the operator. The construction also eliminates the usual ball check valve customarily employed, which sometimes leaks mercury to the column. The arrangement also reduces the dead space or volume between the column and the receiving system, thereby reducing another source of inaccuracy. The control is entirely automatic; and when once set, it holds pressure within the distillation column without attention or manipulation on the part of the operator. While illustrating it in connection with an analytical distilling and fractionating system, it is to be understood that the device is capable of wider application, and may be employed to control the distillation pressure in vapor offtakes from fractionating columns or distilling vessels generally, or may be employed to control flow through a fluid conduit at a predetermined pressure.

Beyond the pressure control manometer, there is positioned a valve 65, controlling communication of tubing 66 either with offtake 39 or with a manometer 67, the latter being used to record the pressure of gas within the vapor receivers. Tubing 66 communicates through stop cocks 68 and 69 with receivers 70 and 71 respectively, by means of tubing 72 and 73. Cocks 74 and 75 positioned within the tubing 72 and 73 respectively also control communication of the receivers with a vapor discharge line 76. The bottoms of receivers 70 and 71 are provided with distillate offtakes 77 and 78 having cocks 79 and 80 affording communication with discharge lines 81 and 82 respectively, or with lines 83 and 84 leading to a suitable manifold or receiver. Tubing 66 extends beyond the receiver connections, and communicates through valve 86 with a suitable vacuum pump or pumps 87 adapted to produce an almost perfect vacuum within the system.

In operation, the distilling and fractionating column and the receivers are evacuated by pump 87 to produce as nearly a perfect vacuum therein as possible. For example, an absolute pressure of less than 5.0 microns (0.005 mm.) may be obtained with conventional equipment now available. Liquid air is introduced in a controlled manner from flask 41 to evaporator 37 to cool the condenser. The sample to be analyzed is introduced through intake 15 to the distillation bulb 13, and may be precooled by surrounding the bulb with a thermos flask containing a suitable refrigerant. By way of example, the analysis of a sample containing a mixture of paraffin gases, propane, isobutane and butane, is described. Bulb and flexible tube 59 of the automatic manometer are adjusted to a suitable height to bring the mercury level in leg 56 to a point just below the tops of the porous disks 60 and 61 for the distillation pressure which is to be maintained,—for example, atmospheric pressure. The cocks 65, 68 and 74 are then turned to allow vapors to pass from the condenser to the receiver 70. Heat input to the distilling bulb is controlled by adjustment of the rheostat 19.

Figure 10:
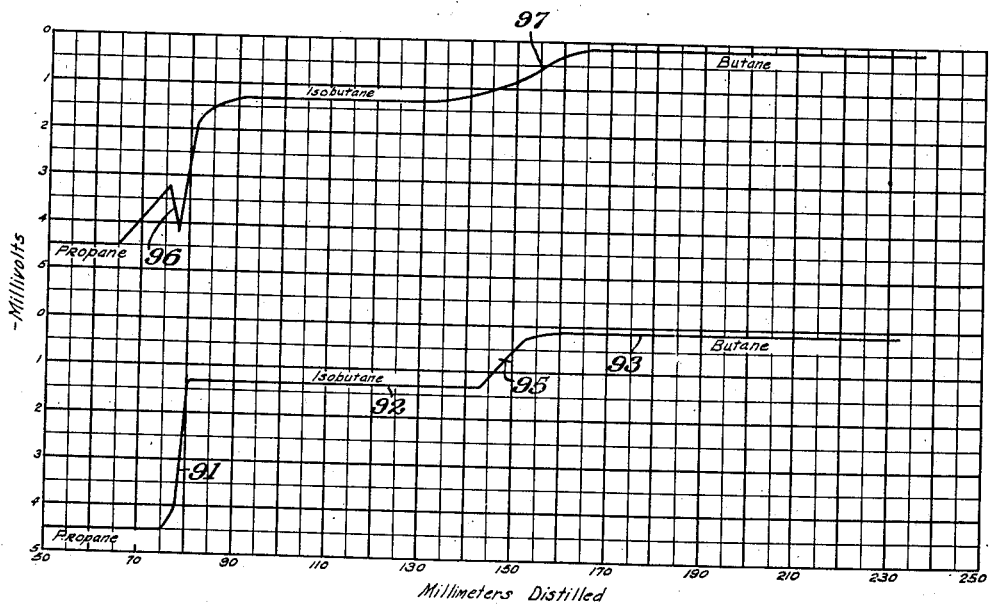
Fig. 10 illustrates typical distillation curves plotted from the results obtained in the analysis of samples of hydrocarbon gases by apparatus of this character.

During the progress of the distillation, simultaneous readings are frequently taken of the temperature at the outlet of the condenser by the milli-volt meter 52, and of the pressure of the vapors which have distilled off to the receiver 70 by the manometer 67. From this data, the analyst constructs a graph, as illustrated in Fig. 10, plotting vapor temperatures (which may be recorded as milli-volts as shown), against the volume of vapors distilled (which may be recorded in milli-meters). Propane, being the lowest boiling constituent of the mixture, passes off first. As the distillation proceeds, it will be noted that the vapor temperature remains substantially constant for a relatively long period, as shown on the chart at 90, which indicates that substantially pure propane is being distilled. After most of this particular hydrocarbon has been distilled, the vapor temperature tends to rise, and this rise should be sharp as indicated at 91, thereby showing that the fractionation has been highly effective in separating propane from the other constituents of the mixture. The temperature then rises to the boiling point of isobutane at the distilling pressure, when the curve again extends in a generally horizontal line 92 termed a "plateau", this being the isobutane plateau. Thereafter, the temperature again rises to the butane plateau indicated at 93. At any given pressure, there are three major controls,—namely, heat input, reflux by top temperature, and rate of distillation. Control of any two automatically determines the third. When the distillation is completed, and the graph prepared, the proportions of the ingredients in the sample are determined from the graph from the relative lengths of the plateaus measured in milli-meters distilled for each constituent. By taking frequent readings, it will be noted that the upwardly rising line connecting two plateaus, termed the "break", will not extend in a true vertical direction but will be somewhat inclined, due to incomplete fractionation, and represents a mixture of two constituents passing off at this time. To compensate for this inclined break, some mid-point indicated at 95 may be arbitrarily selected as the dividing line between the two ingredients.

The upper curve in Fig. 10 represents a typical analysis employing conventional equipment now an the market. As will be noted from the curve, there is a "reverse break" 96 between the propane and isobutane plateaus, which is found when frequent and sensitive readings are taken. This indicates not only poor fractionation, but also the trapping of vapor of the lower boiling constituent within the column due to the substantial dead space volume, followed by the sudden release of this trapped vapor as the distillation proceeds. Between the isobutane and butane plateaus, it will be noted that the curve at 97 slopes upwardly at a gradual rate, termed a "slurred break", indicating that the fractionation is very poor. As pointed out above, these inaccuracies show up when frequent and accurate readings are recorded during distillation.

Actual tests on samples of gaseous hydrocarbon mixtures of known composition have shown that only approximate results are obtainable, which frequently are less than 70% accurate. By the improvements of the present invention, affording more complete fractionation, more effective condensation, less dead space for the hold-back of vapor, and an accurate and automatic control of the distillation pressure eliminating the human variable, reproducible results have been regularly obtained which exceed 95% accuracy, and frequently run over 99%. The lower curve of Fig. 10 indicates a typical analysis employing the apparatus of the present invention, and utilizing the same frequent and critical readings as employed in the upper curve.

Obviously many modifications and variations of the invention, as hereinbefore set forth, may be made without departing from the spirit and scope thereof, and therefore only such limitations should me imposed as are indicated in the appended claims.

I claim:

1. In apparatus for precise analytical distillation and fractionation, having a distilling section and a condensing section, and an elongated and jacketed fractionating tube of small cross-sectional area between the distilling and condensing sections and adapted for substantially adiabatic fractionation; a packing for said fractionating tube comprising a spiral wire having a hollow core fitting snugly against the internal wall of said tube, and a solid insert within said spiral wire substantially filling the hollow core of said spiral wire and forcing vapors and reflux liquid to travel spirally through the tube in countercurrent flow and intimate contact with each other without any substantial free linear flow through the core of the spiral wire, said spiral wire being of larger cross sectional area than said insert to provide substantial space between the interior wall of the tube and said insert to avoid flooding of the tube with reflux.

2. In apparatus for precise analytical distillation and fractionation, having a distilling section and a condensing section, and an elongated and jacketed fractionating tube of small cross-sectional area between the distilling and condensing sections and adapted for substantially adiabatic fractionation; a packing for said fractionating tube comprising a helical wire coil of substantially uniform size and turns per unit of length fitting snugly against the internal wall of said tube, and a solid insert of substantially uniform cross section extending through the core of said coil substantially throughout the length thereof, said insert having a cross section to substantially fill the internal core of said coil.

3. In apparatus for precise analytical distillation and fractionation, having a distilling bulb adjacent the lower end thereof, a condenser section adjacent the upper end thereof, and an elongated jacketed fractionating tube having an internal diameter of less than 10 mm. connecting the distilling bulb with said condenser section and adapted for substantially adiabatic fractionation; a packing for said fractionating tube comprising a spiral wire having a substantial uniform pitch of from 4 to 8 turns per inch fitting snugly against the interior wall of said tube, and a wire insert of substantially uniform cross section extending through the spiral and substantially filling the central core of said spiral, the cross sectional area of said spiral being greater than the cross sectional area of said insert.

4. In apparatus for precise analytical distillation and fractionation, having a distilling bulb adjacent the lower end thereof, a condenser section adjacent the upper end thereof, and an elongated jacketed fractionating tube having an internal diameter of less than 10 mm. connecting the distilling bulb with said condenser section, and adapted for substantially adiabatic fractionation; a packing for said tube comprising wire spiral fitting snugly against the interior wall of said tube, and a straight wire insert extending through the spiral and substantially filling the central core of said spiral, said tube and packing having substantially equivalent proportions to a fractionating tube of 3.8 mm. internal diameter, provided with a 6 turn per inch #15 gauge wire spiral and a #23 gauge straight wire insert.

5. In apparatus for precise analytical distillation and fractionation, having a distilling bulb adjacent the lower end thereof, a condenser section adjacent the upper end thereof, and an elongated jacketed fractionating tube having an internal diameter of less than 10 mm. connecting the distilling bulb with said condenser section and adapted for substantially adiabatic fractionation; a packing for said tube comprising a wire spiral fitting snugly against the interior wall of said tube, and a flat spiral insert extending through the outer spiral and substantially filling the central core thereof, said tube and packing having substantially equivalent proportions to a fractionating tube of 3.8 mm. internal diameter, provided with a 6 turn per inch #16 gauge wire spiral and a 6 turn per inch flat spiral of sufficient width to substantially contact with the inner surface of the outer spiral along the length thereof.

6. In apparatus for precise analytical distillation and fractionation, having a distilling section and an elongated fractionating tube communicating with said distilling section; a condenser section adjacent the upper portion of said tube comprising an insulating jacket surrounding and spaced from said portion of the tube to form a dry cooling chamber therebetween and in direct thermal contact with the exterior wall of said tube, an evaporator within said chamber adjacent the upper portion thereof, means for supplying a refrigerant to said evaporator for expansion therein, said evaporator having a plurality of downwardly directed distributing ports for the direct introduction of the expanded refrigerant into said cooling chamber beneath said evaporator for the dry cooling of said tube.

7. In apparatus for precise analytical distillation and fractionation, having a distilling section and an elongated fractionating tube communicating with said distilling section; a condenser section adjacent the upper portion of said tube comprising an insulating jacket surrounding and spaced from said portion of the tube to form a dry cooling chamber therebetween and in direct thermal contact with the exterior wall of said tube, an evaporator within said chamber adjacent the upper portion thereof, means for supplying a refrigerant to said evaporator for expansion therein, said evaporator having a plurality of downwardly directed distributing ports for the direct introduction of the expanded refrigerant into said cooling chamber beneath said evaporator for the dry cooling of said tube, and a plurality of heat conducting elements within said cooling chamber beneath said evaporator and contacting with the exterior wall of said tube.

8. In apparatus for precise analytical distillation and fractionation, having a distilling section and an elongated fractionating tube communicating with said distilling section; a condenser section adjacent the upper portion of said tube comprising an insulating jacket surrounding and spaced from said portion of the tube to form a dry cooling chamber therebetween and in direct thermal contact with the exterior wall of said tube, an evaporator within said chamber adjacent the upper portion thereof, means for supplying a refrigerant to said evaporator for expansion therein, said evaporator having a plurality of downwardly directed distributing ports for the direct introduction of the expanded refrigerant into said cooling chamber beneath said evaporator for the dry cooling of said tube, and a plurality of metallic balls formed of metal of high heat conductivity substantially filling the space within said cooling chamber beneath said evaporator, said balls being of sufficient diameter to provide a void of substantial volume for the circulation of expanded refrigerant within said cooling chamber.

9. In apparatus for precise analytical distillation and fractionation, having a distilling bulb adjacent the lower end thereof, and an elongated fractionating tube of internal diameter of less than 10 mm. surmounting said distilling bulb; a condenser section adjacent the upper portion of said tube comprising a cooling chamber, a condenser tube communicating with said fractionating tube and positioned within said cooling chamber, said condenser tube having a substantially greater effective surface to volume ratio than that of said fractionating tube, the said effective surface being directly exposed to cooling medium within said cooling chamber.

10. In apparatus for precise analytical distillation and fractionation, having a distilling bulb adjacent the lower end thereof, and an elongated fractionating tube of internal diameter of less than 10 mm. surmounting said distilling bulb; a condenser section adjacent the upper portion of said tube comprising a cooling chamber, a condenser tube communicating with said fractionating tube and positioned within said cooling chamber, said condenser tube being of smaller internal diameter than said fractionating tube, and having a plurality of indentations in the wall thereof to materially increase the effective surface to volume ratio of the said condenser tube.

11. In apparatus for precise analytical distillation and fractionation, having a distilling bulb adjacent the lower end thereof, and an elongated fractionating tube of internal diameter of less than 10 mm. surmounting said distilling bulb; a condenser section adjacent the upper portion of said tube comprising a cooling chamber, a condenser tube communicating with said fractionating tube and positioned within said cooling chamber, said condenser tube comprising an external tube and an internal tube forming an annular vapor condensing passage therebetween, said internal tube freely communicating with the space within said cooling chamber so that the walls of both said exterior and interior tubes form effective condensing surfaces.

12. In apparatus for precise analytical distillation and fractionation, having a distilling bulb adjacent the lower end thereof, and an elongated fractionating tube surmounting said distilling bulb; a condenser section adjacent the upper portion of said tube comprising a condenser tube communicating with said fractionating tube, an insulating jacket surrounding and spaced from said condenser tube and forming a dry cooling chamber therebetween and in direct thermal contact with the exterior wall of said condenser tube, an evaporator within said chamber adjacent the upper portion thereof, means for supplying a refrigerant to said evaporator for expansion therein, said evaporator having a plurality of downwardly directed distributing ports for the direct introduction of expanded refrigerant into said cooling chamber beneath the evaporator for the dry cooling of said condenser tube, a plurality of metallic balls of substantial size and formed of metal of high heat conductivity within the space of said cooling chamber beneath said evaporator and directly contacting with the exterior wall of said condenser tube, said condenser tube having a substantially greater effective surface to volume ratio than that of said fractionating tube, the said effective surface being directly exposed to the cooling medium within said cooling chamber.

13. Apparatus for distillation and fractionation, comprising in combination, a distilling means, a fractionating tube communicating with said distilling means, a partial condenser for condensing vapors passing from said fractionating tube and for supplying reflux to the fractionating tube, a receiver, a vapor offtake leading from said partial condenser to said receiver, a liquid valve within said vapor offtake, and pressure responsive means for automatically actuating said liquid valve for opening and closing said vapor offtake in accordance with variations in pressure within said fractionating tube from a predetermined normal.

14. In apparatus for distillation and fractionation, having a distilling means, a fractionating tube communicating with said distilling means, a partial condenser for condensing vapors from said fractionating tube and for supplying reflux to said fractionating tube, a receiver, and a vapor offtake leading from said partial condenser to said receiver; a liquid seal for closing said vapor offtake, and a manometer responsive to pressure within said fractionating tube for actuating said liquid seal to open and close the said vapor offtake in accordance with variations in pressure within said fractionating tube from a predetermined normal.

15. In apparatus for distillation and fractionation, having a distilling means, a fractionating tube communicating with said distilling means, a partial condenser for condensing vapors from said fractionating tube and for supplying reflux to said fractionating tube, a receiver, and a vapor offtake leading from said partial condenser to said receiver; a manometer having one leg opening into said vapor offtake and responsive to pressure therein, a liquid medium within said manometer, and a member within said vapor offtake having a porosity to pass vapor but prevent flow of the said liquid medium therethrough, the level of said liquid medium fluctuating along the side of said member to thereby alter the effective vapor flow passage of the vapor offtake in accordance with variations in pressure within the vapor offtake from a predetermined normal.

16. In apparatus for distillation and fractionation, having a distilling means, a fractionating tube communicating with said distilling means, a partial condenser for condensing vapors from said fractionating tube and for supplying reflux to said fractionating tube, a receiver, and a vapor offtake having a generally horizontal portion and leading from said partial condenser to said receiver; a mercury manometer having a downwardly depending leg opening at its upper end into the said generally horizontal portion of said vapor offtake and responsive to pressure therein, porous members within said vapor offtake at opposite sides of said manometer leg opening, said members being porous to the passage of vapor but impervious to mercury, and means for adjusting the level of mercury within said manometer leg to a point opposite said porous members for a predetermined pressure within said vapor offtake, whereby reduction of pressure within said fractionating tube and vapor offtake causes the mercury level to rise along the sides of said porous members to thereby reduce the effective size of the vapor offtake in accordance with the extent of reduction in pressure from the predetermined normal.

17. Distillation apparatus comprising in combination, a fractionating column, a vapor offtake from said fractionating column, a liquid valve for said vapor offtake, and pressure responsive means automatically actuating said liquid valve for controlling the rate of flow of vapor from said fractionating column through said vapor offtake in accordance with the variations in pressure within said column from a predetermined normal.

18. In apparatus of the character described, a vapor passage, a manometer having one leg communicating at its upper end with said vapor passage and responsive to pressure therein, a member within said vapor passage porous to vapor but impervious to liquid within said manometer, and means for adjusting the liquid level in said manometer leg to a point opposite said porous member for a predetermined pressure within said vapor passage, whereby a reduction in pressure within said passage below said predetermined normal causes said liquid to rise along the side of said porous member to thereby reduce the effective flow area of said vapor passage in accordance with the extent in reduction in pressure below said predetermined normal.

WALLACE A. McMILLAN.